(12) United States Patent
Spryshak (10) Patent No.: US 8,747,523 B2
(45) Date of Patent: Jun. 10, 2014

(54) WATER SEPARATOR HAVING A FILTER ASSEMBLY

(75) Inventor: Joseph Spryshak, Hartland, MI (US)

(73) Assignee: Valeo Climate Control, Auburn Hills, MI (US)

(*) Notice: Subject to any disclaimer, the term of this patent is extended or adjusted under 35 U.S.C. 154(b) by 341 days.

(21) Appl. No.: 13/336,619

(22) Filed: Dec. 23, 2011

(65) Prior Publication Data

US 2013/0160648 A1    Jun. 27, 2013

(51) Int. Cl.
*B01D 45/00* (2006.01)

(52) U.S. Cl.
USPC ............ 95/268; 95/272; 96/220; 55/320; 55/337; 55/385.3; 55/413; 55/462; 55/439; 55/410; 55/464; 55/421; 55/481; 55/423; 55/492; 55/478

(58) Field of Classification Search
USPC ........ 55/320–337, 385.3, 413, 439, 462, 410, 55/464, 421, 423, 492, 478, 481; 96/220; 95/268, 272; 62/92; 165/167
See application file for complete search history.

(56) References Cited

U.S. PATENT DOCUMENTS

| 4,350,504 | A  | * | 9/1982 | Diachuk | 422/105 |
|---|---|---|---|---|---|
| 4,608,062 | A  | * | 8/1986 | Hughes | 96/190 |
| 7,197,885 | B2 |   | 4/2007 | Kozak et al. | |
| 7,524,362 | B2 | * | 4/2009 | Wu et al. | 96/15 |
| 8,002,868 | B2 | * | 8/2011 | Kim et al. | 55/481 |

* cited by examiner

*Primary Examiner* — Jason M Greene
*Assistant Examiner* — Dung H Bui
(74) *Attorney, Agent, or Firm* — Howard & Howard Attorneys PLLC (57) ABSTRACT

A water separator reduces a water content of an air stream, which is used in an HVAC unit for a vehicle. The water separator includes a diverter wall and an adjacent wall spaced from the diverter wall to define an air passage. The diverter wall has a terminal end extending into the air passage for changing a direction of the air stream to reduce the water content of the air stream. A filter assembly is disposed through a receiving slot in the diverter wall and is within the air passage downstream of the terminal end.

14 Claims, 6 Drawing Sheets

WATER SEPARATOR HAVING A FILTER ASSEMBLY

BACKGROUND OF THE INVENTION

1. Field of the Invention

The invention generally relates to a water separator. More specifically, the invention relates to a water separator having a filter assembly.

2. Description of the Related Art

The use of a Heating, Ventilating, and/or Air-conditioning (HVAC) unit in vehicles is known in the art. It is desirable to reduce a water content of an air stream used in the HVAC unit to prevent moisture from being introduced into a passenger compartment of the vehicle. Moisture causes failures of electrical components and can cause odors, which enter the passenger compartment of the vehicle. Moreover, it is desirable to reduce the water content of the air stream used in the HVAC unit to avoid any risk of moisture forming mist or fog on windows in the passenger compartment of the vehicle. As such, the HVAC unit includes a conventional water separator for reducing the water content of the air stream used in the HVAC unit. Generally, the conventional water separator changes a direction of the air stream flowing through the water separator to force water droplets from the air stream thereby reducing the water content of the air stream.

It is also desirable to filter the air stream to eliminate particles from the air stream before the air stream is used in the HVAC unit. As such, the conventional water separator may include a filter assembly disposed within the air passage of the water separator.

The air stream passes through the filter such that the filter collects particles that may be present in the air stream. Over time, buildup of the particles on the filter can occur, which clogs the filter and hinders the flow of the air stream through the water separator. Once the filter becomes clogged it should be replaced.

However, in the conventional water separators that include the filter, it is difficult to remove the filter from the air passage. More specifically, due to certain restraints on HVAC units, the filter of the conventional water separator can only be replaced by at least partially dissembling the conventional water separator and/or the HVAC unit. For example, there may be packaging constraints on the conventional water separator that require the filter to be positioned within the conventional water separator, such that the conventional water separator must be disassembled to access the filter. Having to disassemble the conventional water separator and/or the HVAC unit to access the filter adds additional service time to replace the filter. Additionally, having to dissemble the conventional water separator and/or the HVAC unit to access the filter requires the use of tools, which may not always be available in the field. Therefore, there remains a need to provide an improved water separator.

SUMMARY OF THE INVENTION AND ADVANTAGES

A water separator reduces a water content of an air stream, which is used in a Heating, Ventilating, and/or Air-conditioning (HVAC) unit for a vehicle. The water separator includes a housing. The housing has a diverter wall and an adjacent wall spaced from the diverter wall. The diverter wall and the adjacent wall define an air passage within the housing for allowing the air stream to flow through the housing. The diverter wall has a terminal end extending into the air passage for changing a direction of the air stream flowing through the air passage. Changing the direction of the air stream flowing through the air passage separates water droplets from the air stream to reduce the water content of the air stream.

An air intake is defined by the housing and is in communication with the air passage for introducing the air stream into the air passage. An air outlet is defined by the housing and is in communication with the air passage downstream from the terminal end of the diverter wall for discharging the air stream that has the reduced water content from the air passage. The air stream discharged from the air passage is use in the HVAC unit.

A filter assembly is disposed within the air passage downstream of the terminal end of the diverter wall for filtering the air stream having the reduced water content. The diverter wall of the housing defines a receiving slot configured to allow the filter assembly to pass through the diverter wall and enter the air passage downstream of the terminal end of the diverter wall. A portion of the filter assembly seals the receiving slot in the diverter wall such that a portion of the filter assembly forms a portion of the air passage. The receiving slot allows the filter assembly to be inserted into and removed from the air passage downstream of the terminal end of the diverter wall to replace the filter assembly. As such, the filter assembly is easily removable from the housing of the water separator without having to remove the water separator or the HVAC unit from the vehicle. Allowing the filter assembly to be easily removed from the housing of the water separator reduces a time required to replace the filter assembly, i.e., the filter is serviceable.

A method of reducing the water content of the air stream used in the HVAC unit of the vehicle with the water separator is also disclosed.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE EXEMPLARY EMBODIMENT

Figure 1:
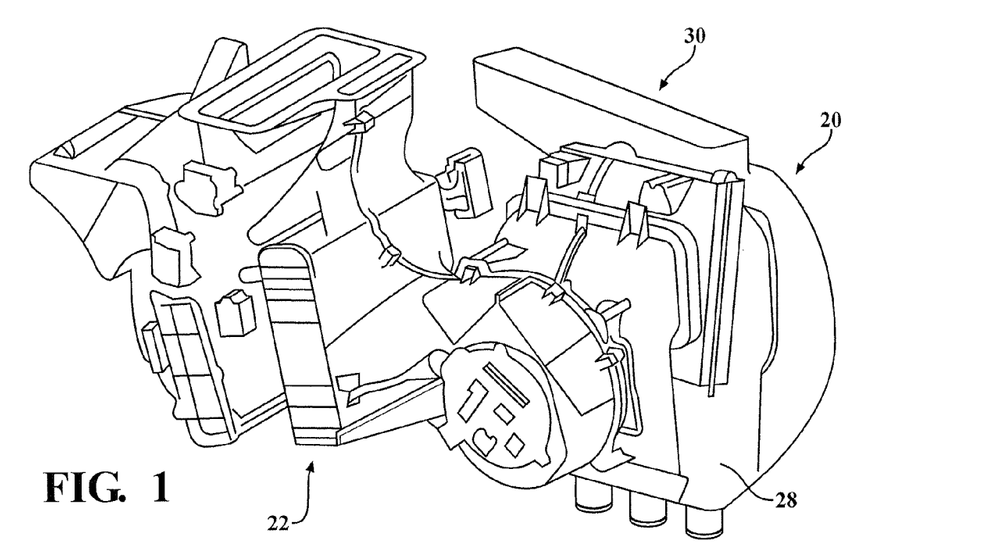
FIG. 1 is a perspective view of a water separator and an HVAC unit.

Referring to the Figures, wherein like numerals indicate corresponding parts throughout the several views, a water separator is generally shown at 20. With reference to FIG. 1, generally, the water separator 20 is part of a Heating, Ventilating, and/or Air-conditioning (HVAC) unit 22 for a vehicle. It is to be appreciated that the water separator 20 may be considered a part of the HVAC unit 22 or a separate component relative to the HVAC unit 22. When the water separator 20 is a separate component relative to the HVAC unit 22, the water separator 20 is typically directly coupled to the HVAC unit 22. However, it is to be appreciated that the water separator 20 is in communication with the HVAC unit 22 even if the water separator 20 is not directly coupled to the HVAC unit 22. It is also to be appreciated that the water separator 20 can be used in other application besides the HVAC unit 22.

Generally, ambient air surrounding the water separator 20 has moisture entrained within it. It is undesirable to use the ambient air in the HVAC unit 22 because such use will result in the introduction of moisture within a passenger compartment of the vehicle. Generally, the introduction of moisture within the passenger compartment of the vehicle causes failure of electrical components and can cause odors, which enter the passenger compartment of the vehicle. Additionally, the introduction of moisture within the passenger compartment of the vehicle result in moisture forming mist or fog on windows in the passenger compartment. Therefore, the water separator 20 treats the ambient air before the ambient air can be used in the HVAC unit 22. More specifically, an air stream 24 comprising the ambient air is introduced into the water separator 20. The air stream 24 that is introduced into the water separator 20 may have a water content, which is related to the moisture entrained within the ambient air. Said differently, because the ambient air may have moisture entrained within it and the ambient air is used to produce the air stream 24, the air stream 24 has the first water content. It is to be appreciated that the term water content as used herein may encompass any form of liquids or vapor that are entrained in the ambient air or the air stream 24 and does not refer only to water entrained within the ambient air or the air stream 24.

Figure 2:
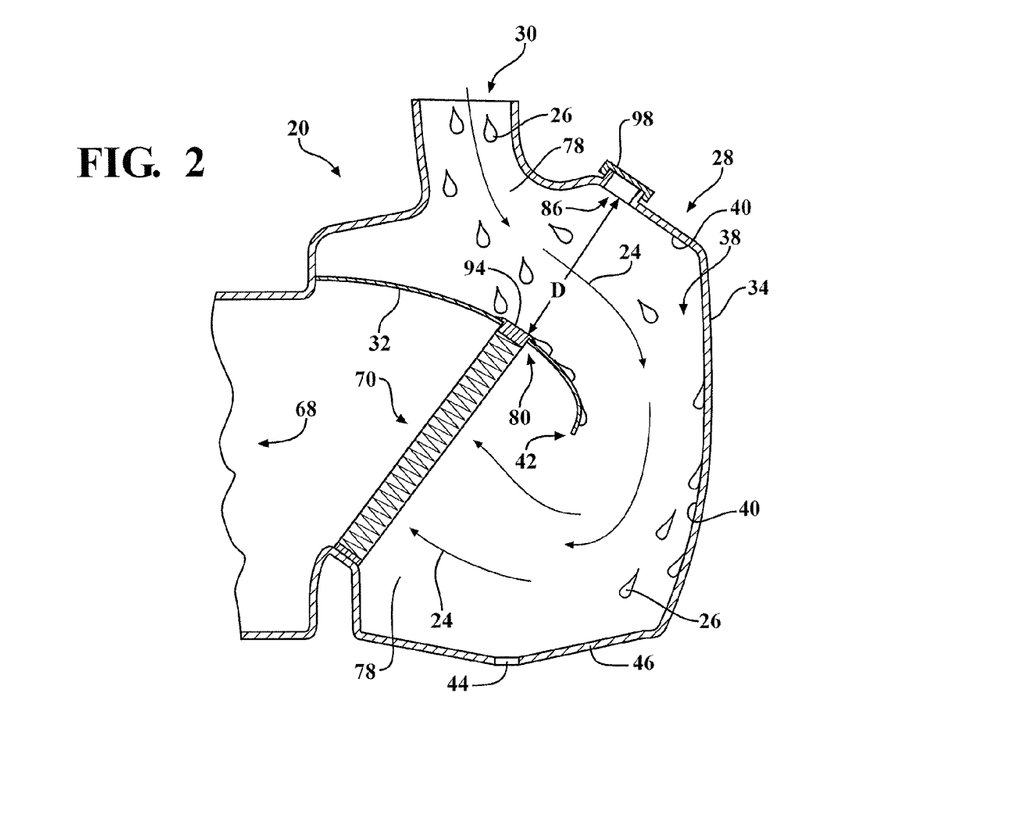
FIG. 2 is a partial cross-sectional view of the water separator showing a filter assembly disposed within an air passage of the water separator.

As best shown in FIG. 2, the air stream 24 flows through the water separator 20 to reduce the water content of the air stream 24. More specifically, the air stream 24 introduced into the water separator 20 has a first water content and the air stream 24 is discharged from the water separator 20 with a second water content. Typically, the second water content of the air stream 24 discharged from the water separator 20 is lower than the first water content. More typically, the air stream 24 discharged from the water separator 20 is dry, such that the sir stream 24 discharged from the water separator 20 contains no water. Said differently, more typically, the second water content of the air stream 24 discharged from the water separator 20 is zero. Generally, the water separator 20 is capable of separating water droplets 26 or other liquids or vapors from the air stream 24 to reduce the water content of the air stream 24. Therefore, the air stream 24 can be used in the HVAC unit 22, and, more specifically, an air conditioning system of the vehicle.

The water separator 20 includes a housing 28. The housing 28 defines an air intake 30 for introducing the air stream 24 into the water separator 20. More specifically, the air intake 30 provides an opening to allow the ambient air to enter the water separator 20 in the form of the air stream 24. When the water separator 20 is coupled to the vehicle, the air intake 30 is exposed to the ambient air for receiving the ambient air. It is to be appreciated that the ambient air can be introduced into the air intake 30 by any suitable methods, such as by suction or by forced air. The ambient air can either be fresh air coming from outside the vehicle or recycled air coming from the passenger compartment of the vehicle. Furthermore, the ambient air can also be a mixture of fresh air and recycled air.

The housing 28 has a diverter wall 32 and an adjacent wall 34 spaced from the diverter wall 32. The housing 28 also has at least two sidewalls 36 with each of the sidewalls 36 interconnecting the diverter wall 32 and the adjacent wall 34. Generally, the diverter wall 32, the adjacent wall 34, and the sidewalls 36 are integral with each other. Said differently, the housing 28 may be made of assembled components such that the diverter wall 32, the adjacent wall 34, and the sidewalls 36 cannot be separated from each other without compromising the quality of the components. The housing 28 can be made from any suitable material, such as metal, plastic, and combinations thereof. Typically, the housing 28 is made from a thermoplastic material, such as polypropylene (PP) or acrylonitrile butadiene styrene (ABS). However, the housing 28, and more specifically the diverter wall 32, the adjacent wall 34, and the side walls are formed from a thermoplastic.

The diverter wall 32 and the adjacent wall 34 define an air passage 38 within the housing 28. More specifically, the diverter wall 32, the adjacent wall 34, and the sidewalls 36 define the air passage 38. The air passage 38 is in communication with the air intake 30 for allowing the air stream 24 to flow through the housing 28. Said differently, the housing 28 has a hollow interior 40, which is the air passage 38 and is defined by the diverter wall 32, the adjacent wall 34, and the sidewalls 36.

The diverter wall 32 has a terminal end 42 extending into the air passage 38 for changing a direction of the air stream 24 flowing through the air passage 38. Said differently, the air passage 38 has a U-shaped configuration at the terminal end 42. The air passage 38 wraps around the terminal end 42 of the diverter wall 32 to change the direction of the air stream 24 flowing through the air passage 38. Said yet another way, the terminal end 42 of the diverter wall 32 turns the air stream 24 around the diverter wall 32 such that the air stream 24 is forced downward and then the air stream 24 is force upward as the air stream 24 flows around the terminal end 42 of the diverter wall 32. Changing the direction of the air stream 24 flowing through the air passage 38 separates water droplets 26 from the air stream 24 to reduce the water content of the air stream 24. Generally, the changing of the direction of the air stream 24 occurs rapidly for forcing the water droplets 26 from the air stream 24. The separation of the water droplets 26 from the air stream 24 lowers the water content of the air stream 24 from the first water content to the second water content.

The water droplets 26 that are separated from the air stream 24 form on the walls of the housing 28, such as the diverter wall 32 and/or the adjacent wall 34. Typically, the water droplets 26 flow by gravity to along the housing 28 and exit the water separator 20 through a drain hole 44 defined by the housing 28. A base 46 of the housing 28 interconnects the diverter wall 32, the adjacent wall 34, and the side walls of the housing 28 and defines the drain hole 44. Generally, the water droplets 26 that form on the adjacent wall 34 and the sidewalls 36 flow by gravity along the walls to the base 46 of the housing 28. The base 46 of the housing 28 is sloped toward the drain hole 44 such that the water droplets 26 that reach the base 46 of the housing 28 flow along the base 46 to the drain hole 44 to exit the water separator 20. Therefore, the water droplets 26 that form on the adjacent wall 34 and the sidewalls 36 are provided with a drainage path that does not cross the air stream 24. Said differently, the drainage path of the water droplets 26 that form on the adjacent wall 34 and the sidewalls 36 does not intersect the air stream 24. As such, the water droplets 26 that form on the adjacent wall 34 and the sidewalls 36 are prevented from reentering the air stream 24.

Figure 3:
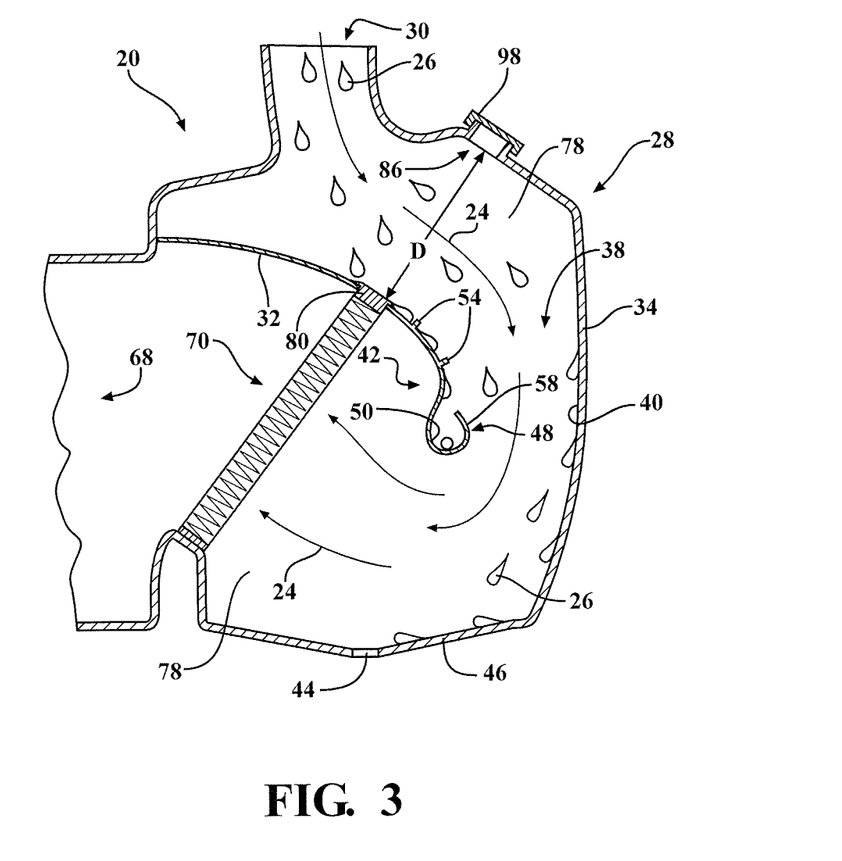
FIG. 3 is another partial cross-sectional view of the water separator showing a gutter coupled to the diverter wall and ribs extending from the diverter wall.

With reference to FIG. 3, the water separator 20 may also includes a gutter 48 coupled to the terminal end 42 of the diverter wall 32 in the air passage 38. The gutter 48 removes the water droplets 26 from the diverter wall 32 to prevent the water droplets 26 from reentering the air stream 24 while minimizing turbulence and pressure drops of the air stream 24 flowing through the air passage 38. The gutter 48 defines a portion the air passage 38 such that the air stream 24 flowing through the air passage 38 must flow around the gutter 48. Said differently, the gutter 48 is an extension of the terminal end 42 of the diverter wall 32. As such, the gutter 48 may be integral to the terminal end 42 of the diverter wall 32 and is therefore integral with the diverter wall 32 itself. Alternatively, the gutter 48 may be a separate component relative to the diverter wall 32.

Generally, the gutter 48 directs the water droplets 26 that form on the diverter wall 32 toward the sidewalls 36. More specifically, the gutter 48 defines a drainage channel 50 configured to receive the water droplets 26 that form on the diverter wall 32. The drainage channel 50 may be in communication with the drain hole 44 in the base 46 of the housing 28. The gutter 48 allows the water separator 20 to reduce the water content of the air stream 24 flowing through the water separator 20 while preventing the entrainment of the water droplets 26 that form within the housing 28 of the water separator 20. Typically, the water droplets 26 collected within the drainage channel 50 are directed toward the sidewalls 36 of the housing 28 to prevent the water droplets 26 that form on the diverter wall 32 from reentering the air stream 24 flowing through the air stream 24 passage. Said differently, the gutter 48 directs the water droplets 26 that form on the diverter wall 32 away from the air stream 24 flowing through the air passage 38.

The drainage channel 50 of the gutter 48 has a slope for allowing the water droplets 26 collected by the drainage channel 50 to flow toward the sidewalls 36 within the drainage channel 50 with the aid of gravity. Directing the water droplets 26 that form on the diverter wall 32 away from the air stream 24 prevents the water droplets 26 from reentering the air stream 24 thereby improving the effectiveness of the water separator 20. Said differently, the interaction of the air stream 24 and the sidewalls 36 of the housing 28 limit an amount of undesirable re-entrainment of the water droplets 26 that form within the housing 28. Therefore, directing the water toward the sidewalls 36 limits the amount of undesirable re-entrainment that occurs as a result of the reentry of the water droplets 26 into the air stream 24. The specific features and characteristics of the gutter 48 are set forth in copending U.S. patent application Ser. No. 13/336,612, filed concurrently herewith and the disclosure of which is incorporated by reference.

Additionally, at least one rib 54 may be coupled to the diverter wall 32 within the air passage 38 upstream from the terminal end 42. Nevertheless, the rib 54 is not required for the gutter 48 to direct the water droplets 26. When employed, the rib 54 directs the water droplets 26 that form on the diverter wall 32 toward the sidewalls 36 of the housing 28 such that the water droplets 26 on the diverter wall 32 are directed away from the terminal end 42 of the diverter wall 32. It is to be appreciated that the ribs 54 may be used in combination with or independent from the gutter 48 described above. Generally, the rib 54 is sloped for allowing the water droplets 26 directed by the rib 54 to flow by gravity toward the sidewalls 36 of the housing 28. When more than one rib 54 is included, the ribs 54 may intersect and/or be at an angle relative to one another for directing the water droplets 26 that form on the diverter wall 32. For example, the ribs 54 may form chevrons on the diverter wall 32.

The housing 28 defines an air outlet 68. The air outlet 68 is in communication with the air passage 38 downstream from the terminal end 42 of the diverter wall 32 for discharging the air stream 24 that has the reduced water content from the air passage 38. Said differently, the air stream 24 having the second water content is discharged from the water separator 20 via the air outlet 68. Typically, the air stream 24 discharged from the air passage 38 of the water separator 20 is then use in the HVAC unit 22. For example, the air stream 24 discharged from the air passage 38 is received by a blower of the HVAC unit 22 to distribute the air stream 24 to the HVAC unit 22 and, more specifically, the air conditioning system. By delivering the air stream 24 having the reduced water content to the blower, the risk of electrical failures, the risk of odors, and the risk of water entering into the passenger compartment of the vehicle are reduced. Additionally, an air temperature can be more effectively controlled and or regulated to increase comfort in a final distribution areas for the air stream 24, such as the passenger compartment of the vehicle. However, it is to be appreciated that the air stream 24 discharged by the air outlet 68 of the water separator 20 may be used in other application besides the HVAC unit 22.

Figure 4:
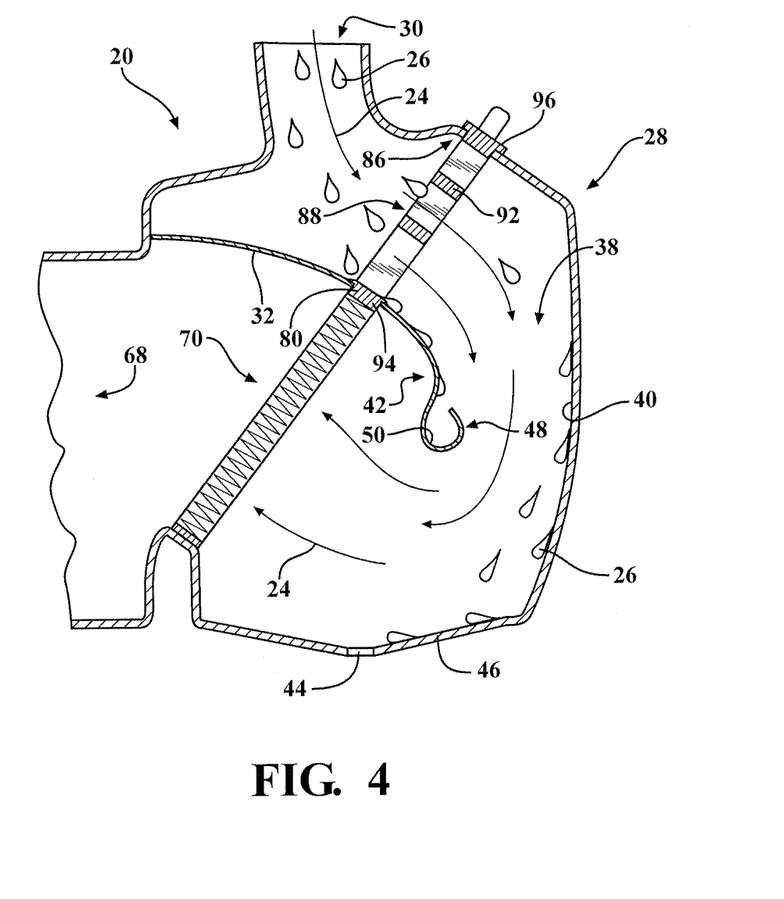
FIG. 4 is another partial cross-sectional view of the water separator showing a support tray with a filter coupled to the support tray and the support tray having an extension portion.

With reference to FIGS. 2-4, the water separator 20 includes a filter assembly 70 disposed within the air passage 38. The filter assembly 70 is generally located within the air passage 38 downstream of the terminal end 42 of the diverter wall 32 for filtering the air stream 24 having the second water content. Typically, the filter assembly 70 includes a support tray 72 and a filter 74 disposed in the support tray 72. Generally, the support tray 72 and the filter 74 each have a rectangular configuration in cross-section. However, it is to be appreciated that the cross-section of the support tray 72 and the filter 74 can have any suitable configuration.

Figure 5:
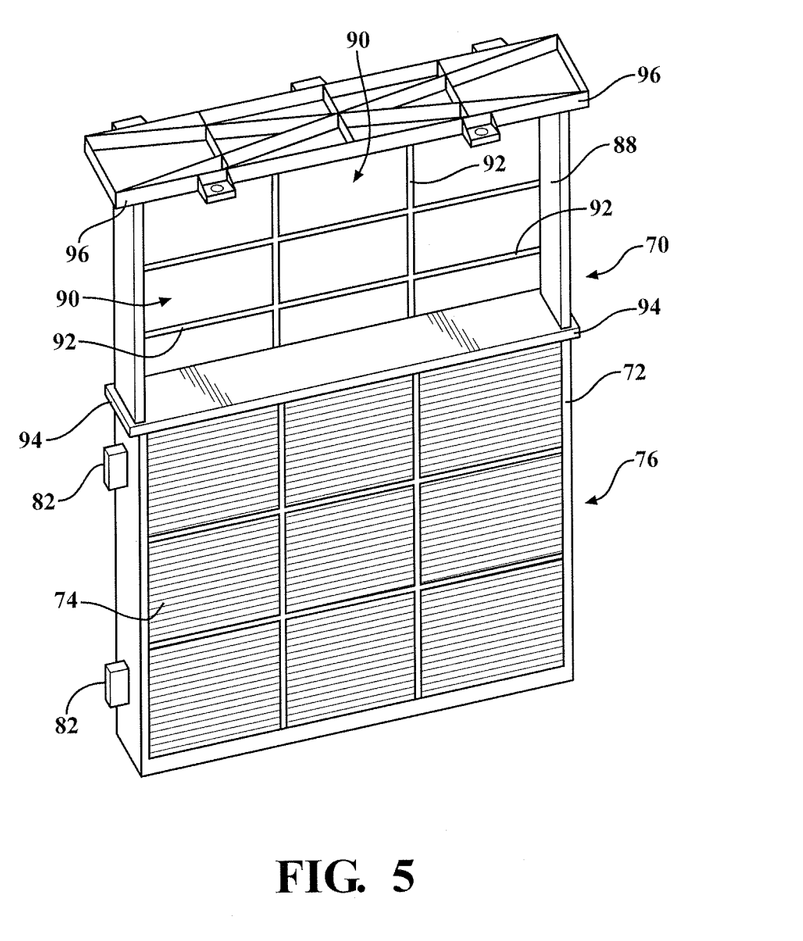
FIG. 5 is a perspective view of the filter assembly.

With reference to FIG. 5, the support tray 72 has a filter portion 76 for receiving the filter 74. Generally, the support tray 72 provides rigidity to the filter 74. Said differently, the support tray 72 is rigid and the filter 74 is disposed within the support tray 72 such that the filter 74 moves with the support tray 72. The air stream 24 flowing through the air passage 38 of the water separator 20 is filtered by the filter 74. Because the filter assembly 70 is located within the air passage 38 downstream from the terminal end 42 of the diverter wall 32, the air stream 24 having the second water content is filtered by the filter 74. Generally, particles 78 in the air stream 24, such as dirt are filtered out of the air stream 24 as the air stream 24 passes through the filter 74. The filtering of the air stream 24 prevents the particles 78 from being introduced into the passenger compartment of the vehicle through the HVAC unit 22.

With reference to FIG. 2, the diverter wall 32 of the housing 28 defines a receiving slot 80 configured to allow the filter assembly 70 to pass through the diverter wall 32 and enter the air passage 38 downstream of the terminal end 42 of the diverter wall 32. Generally, the receiving slot 80 has a configuration that is complementary to the cross-sectional configuration of the support tray 72. More specifically, the receiving slot 80 is slightly larger than the cross-section of the support tray 72 to allow the support tray 72 to easily pass through the receiving slot 80 and into the air passage 38 downstream of the terminal end 42 of the diverter wall 32. A portion of the filter assembly 70 seals the receiving slot 80 in the diverter wall 32 such that the filter assembly 70 forms a portion of the air passage 38.

With reference to FIGS. 5-9, the support tray 72 may have a pair of tabs 82 extending from the support tray 72 and the diverter wall 32 may define a pair of notches 84 in communication with the receiving slot 80. In such an embodiment, the pair notches 84 receive the pair of tabs 82 for ensuring proper alignment of the support tray 72 within the air passage 38. Furthermore, the pair of notches 84 may also be defined by the sidewalls 36 of the housing 28. The pair of tabs 82 may extend along a length of the support tray 72 such that the pair of tabs 82 engage the pair of notches 84 defined by the diverter wall 32 and the sidewalls 36 of the housing 28. In such an embodiment, the pair of notches 84 guide the support tray 72, and therefore the filter assembly 70, into the air passage 38.

As states above, the diverter wall 32, the adjacent wall 34, and the sidewalls 36 are generally integral with each other. Said differently, the housing 28 cannot be taking apart to provide access to the filter assembly 70. Therefore, the adjacent wall 34 of the housing 28 defines a pass-through slot 86 spaced from the air intake 30 and aligned with the receiving slot 80 in the diverter wall 32. The pass-through slot 86 allows the filter assembly 70 to be inserted through the adjacent wall 34 such that the filter assembly 70 can be inserted into and removed from the air passage 38 downstream of the terminal end 42 of the diverter wall 32 to replace the filter assembly 70. As such, the filter assembly 70 is easily removable from the housing 28 of the water separator 20 without having to remove the water separator 20 or the HVAC unit 22 from the vehicle. Allowing the filter assembly 70 to be easily removed from the housing 28 of the water separator 20 reduces a time required to replace the filter assembly 70. Additionally, because the filter assembly 70 is easily removable, the water separator 20 can achieve more compact and efficient designs otherwise not possible. Furthermore, providing a removable filter assembly 70 provides drying advantages for reducing the water content of the air stream 24.

With reference to FIGS. 4 and 5, the support tray 72 may have an extension portion 88 extending from the filter portion 76 for extending an area of the filter assembly 70 to allow the filter assembly 70 to be accessed through the pass-through slot 86 in the adjacent wall 34. Said differently, the pass-through slot 86 in the adjacent wall 34 is spaced a distance D from the receiving slot 80 in the diverter wall 32. The extension portion 88 of the support tray 72 allows the filter assembly 70 to be easily removed from the housing 28 without the aid of tools thereby decreasing an amount of time to replace the filter assembly 70.

The extension portion 88 of the support tray 72 is disposed within the air passage 38 upstream from the terminal end 42 of the diverter wall 32 and the filter portion 76 of the support tray 72 is disposed within the air passage 38 downstream from the terminal end 42 of the diverter wall 32. As such, the extension portion 88 of the support tray 72 defines at least one void 90 for allowing the air stream 24 to pass through the extension portion 88 of the support tray 72. For example, the extension portion 88 of the support tray 72 may be a thin frame about the perimeter of the filter assembly 70 with the interior of the extension portion 88 absent to define the void 90. The extension portion 88 of the support tray 72 may include reinforcing ribs 92 for providing the extension portion 88 of the support tray 72 with rigidity.

The support tray 72 of the filter assembly 70 may include a flange 94 for sealing the receiving slot 80 within the diverter wall 32 such that the flange 94 defines a portion of the air passage 38 upstream from the terminal end 42 of the diverter wall 32. The flange 94 also seals the receiving slot 80 for preventing the air stream 24 from flowing thorough the receiving slot 80 in the diverter wall 32 to prevent the air stream 24 from circumventing the terminal end 42 of the diverter wall 32. Likewise, the extension portion 88 of the support tray 72 may include a gasket 96 that seals the pass-through slot 86 in the adjacent wall 34 of the housing 28 for preventing the air stream 24 from entering or exiting the air passage 38 through the pass-through slot 86 in the adjacent wall 34 of said housing 28. When employed, the gasket may cooperate with a tongue and groove engagement with the pass-through slot in the adjacent wall of the housing. Alternatively, the water separator 20 may further include a slot cover 98 removable coupled to the pass-through slot 86 for sealing the pass-through slot 86. When present, the slot cover 98 is removed from the housing 28 to allow access to the pass-through slot 86 to insert or remove the filter assembly 70 from the housing 28 of the water separator 20 through the pass-through slot 86. Alternatively, the slot cover 98 can be integrated into the support tray 72 of the filter assembly 70 to define the gasket 96.

When the filter assembly 70, and more specifically the filter 74 itself, is disposed within the air passage 38 downstream from the terminal end 42 of the diverter wall 32, the filter assembly 70 can be removed from the air passage 38 by pulling the support tray 72 through the pass-through slot 86. When the support tray 72 does not include the extension portion 88, the support tray 72 must be accessed at the diverter wall 32. However, when the tray includes the extension portion 88, the support tray 72 can be accessed at the adjacent wall 34 such that the extension portion 88 spans the distance D between the receiving slot 80 and the pass-through slot 86. The filter assembly 70 can be inserted through the pass-through slot 86 and pushed through the portion of the air passage 38 upstream from the terminal end 42 of the diverter wall 32 until the filter portion 76 of the support tray 72 engages the receiving slot 80 and the filter portion 76 of the support tray 72 is fully seated within the air passage 38 downstream from the terminal end 42 of the diverter wall 32.

A method of filtering the air stream 24 used in the HVAC unit 22 of the vehicle is disclosed below. Specifically, the method includes the step of inserting the filter assembly 70 through the pass-through slot 86 defined by the adjacent wall 34 of the housing 28 of the water separator 20. The filter assembly 70 is also inserted through the receiving slot 80 defined by the diverter wall 32 of the housing 28 such that at least a portion of the filter assembly 70 is disposed within the air passage 38 downstream of the terminal end 42 of the diverter wall 32 of the housing 28.

Figure 6:
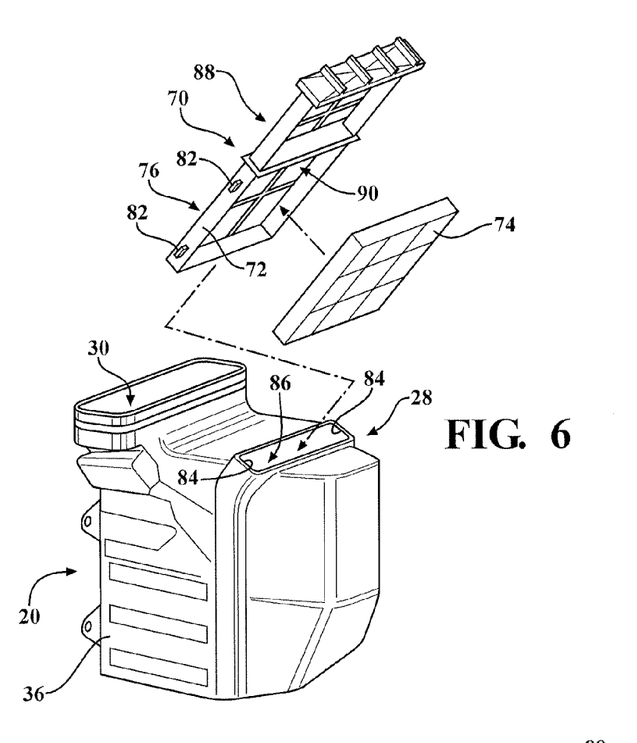
FIG. 6 is an exploded assembly perspective view of the filter assembly and water separator.
Figure 7:
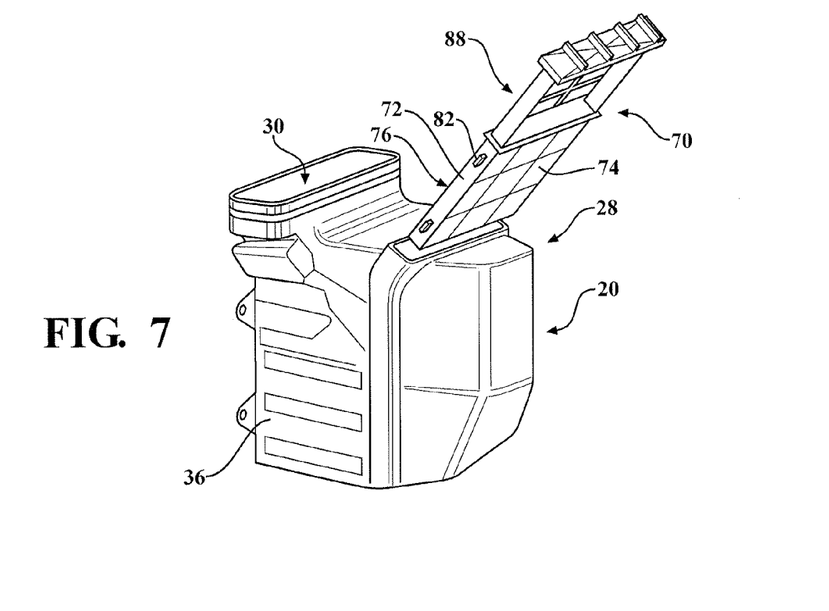
FIG. 7 is a perspective view of the filter assembly positioned near a pass-through slot in the water separator.
Figure 8:
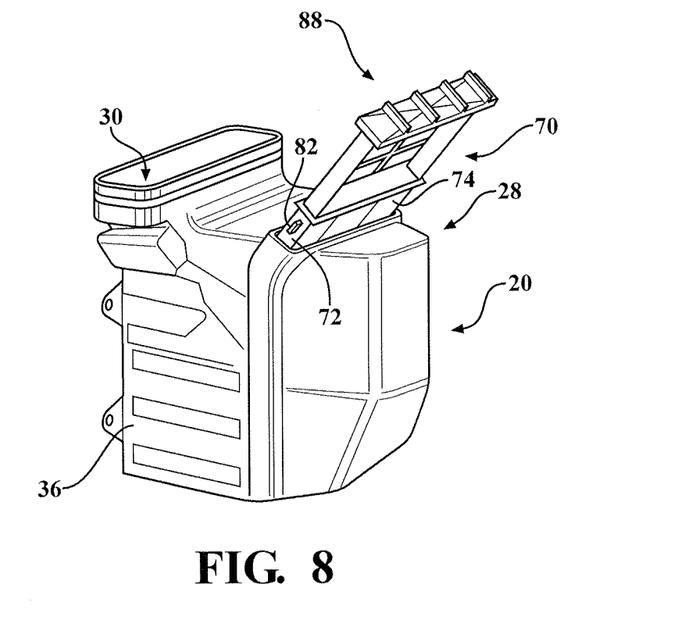
FIG. 8 is a perspective view of the filter assembly partially inserted into the pass-through slot of the water separator.
Figure 9:
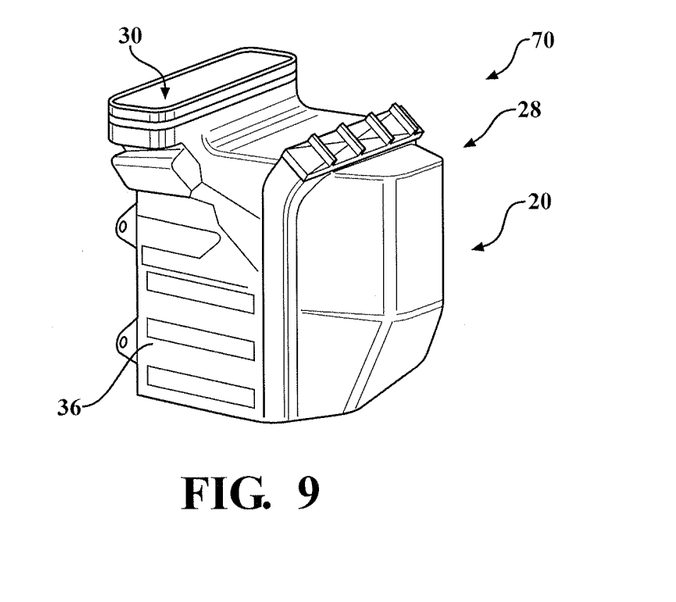
FIG. 9 is a perspective view of the filter assembly fully inserted into the pass-through slot of the water separator.

FIGS. 6-9 show the filter assembly 70 in various stages of insertion into the housing 30. More specifically, FIG. 6 shows the filter 74 spaced from the support tray 72 with the support tray 72 spaced from the water separator 20. FIG. 7 shows the filter 74 coupled to the support tray 72 with the support tray aligned with the pass-through slot 86. FIG. 8 shows the support tray 72 partially inserted into the pass-through slot 86 of the water separator 20. FIG. 9 shows the support tray 72 completely inserted into the pass-through slot 86 of the water separator 20.

The pass-through slot 86 in the adjacent wall 34 of the housing 28 is then sealed to prevent the air stream 24 from entering or exiting the air passage 38 through the pass-through slot 86. The air stream 24 is then introduced into the air passage 38 through the air intake 30. The air stream 24 then flows through the air passage 38 and the terminal end 42 of the diverter wall 32 to change the direction of the air stream 24 thereby reducing the water content of the air stream 24. The air stream 24 also flows through the filter assembly 70 disposed in the air passage 38 downstream of the terminal end 42 of the diverter wall 32 for filtering the air stream 24 having the reduced water content. The air stream 24 having the reduced water content is then discharged from the air passage 38 of the water separator 20 through the air outlet 68.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A water separator for reducing a water content of an air stream used in a Heating, Ventilating, and/or Air-conditioning (HVAC) unit of a vehicle, said water separator comprising:
   an air intake for introducing the air stream into said water separator;
   a housing defining said air intake and having a diverter wall and an adjacent wall spaced from said diverter wall with said diverter wall and said adjacent wall defining an air passage within said housing and is in communication with said air intake for allowing the air stream to flow through said housing with said diverter wall having a terminal end extending into said air passage for changing a direction of the air stream flowing through said air passage thereby separating water droplets from the air stream to reduce the water content of the air stream;
   an air outlet defined by said housing and in communication with said air passage downstream from said terminal end of said diverter wall for discharging the air stream having the reduced water content from said air passage for use in the HVAC unit; and
   a filter assembly disposed within said air passage downstream of said terminal end of said diverter wall for filtering the air stream having the reduced water content;
   wherein said diverter wall of said housing defines a receiving slot configured to allow said filter assembly to pass through said diverter wall and enter said air passage downstream of said terminal end of said diverter wall with a portion of said filter assembly sealing said receiving slot in said diverter wall such that a portion of said filter assembly forms a portion of said air passage.

2. A water separator as set forth in claim 1 wherein said adjacent wall of said housing defines a pass-through slot spaced from said air intake and aligned with said receiving slot in said diverter wall for allowing said filter assembly to be inserted into and removed from said air passage downstream of said terminal end of said diverter wall to replace said filter assembly.

3. A water separator as set forth in claim 2 wherein said filter assembly includes a support tray and a filter disposed in said support tray such that said support tray provides rigidity to said filter and with said filter filtering the air stream having the reduced water content.

4. A water separator as set forth in claim 3 wherein said support tray has a pair of tabs extending and said diverter wall define a pair of notches in communication with said receiving slot with said pair notches receiving said pair of tabs for ensuring proper alignment of said support tray within said air passage.

5. A water separator as set forth in claim 4 wherein said housing has a pair of sidewalls interconnecting said diverter wall and said adjacent wall with said sidewalls also defining said air passage and wherein said pair of notches are also defined by said sidewalls of said housing and said pair of tabs extend along a length of said support tray such that said pair of tabs engage said pair of notches defined by said diverter wall and said sidewalls of said the housing for guiding said filter assembly into said air passage.

6. A water separator as set forth in claim 3 wherein said support tray of said filter assembly include a flange sealing said receiving slot within said diverter wall such that said flange defines a portion of said air passage upstream from said terminal end of said diverter wall for preventing the air stream from flowing thorough said receiving slot in said diverter wall.

7. A water separator as set forth in claim 3 wherein said support tray of said filter assembly has a filter portion for receiving said filter and an extension portion extending from said filter portion with said extension portion disposed within said air passage upstream from said terminal end of said diverter wall and said filter portion is disposed within said air passage downstream from said terminal end of said diverter wall.

8. A water separator as set forth in claim 7 wherein said extension portion of said support tray defines a plurality of voids from allowing the air stream to pass through said extension portion of said support tray.

9. A water separator as set forth in claim 7 wherein said support tray of said filter assembly further includes reinforcing ribs within said extension portion of said support tray for providing said support tray with rigidity.

10. A water separator as set forth in claim 7 wherein said support tray of said filter assembly includes a gasket that seals said pass-through slot in said adjacent wall of said housing for preventing the air stream from entering or exiting said air passage through said pass-through slot in said adjacent wall of said housing.

11. A water separator as set forth in claim 7 wherein said support tray of said filter assembly includes a gasket that cooperates with a tongue and groove engagement with said pass-through slot in said adjacent wall of said housing for preventing the air stream from entering or exiting said air passage through said pass-though slot in said adjacent wall of said housing.

12. A water separator as set forth in claim 1 wherein said diverter wall has at least one rib for directing water droplets that form on said diverter wall as the air stream passes through said air passage away from said terminal end of said diverter wall.

13. A water separator as set forth in claim 1 further comprising a gutter coupled to said terminal end of said diverter wall for collecting water droplets that form on said diverter wall as the air stream passes through said air passage to prevent the water droplets from reentering the air stream.

14. A method of filtering an air stream within a water separator, which reduces a water content of the air stream for use in an HVAC unit of a vehicle with the water separator comprising a housing having a diverter wall and an adjacent wall both defining an air passage with the diverter wall having a terminal end extending into said air passage to present the air passage with a general U-shaped configuration, said method comprising the steps of:
   inserting a filter assembly through a pass-through slot defined by the adjacent wall of the housing of the water separator;
   inserting the filter assembly through a receiving slot defined by the diverter wall of the housing such that at least a portion of the filter assembly is disposed within the air passage downstream of the terminal end of the diverter wall of the housing;
   sealing the pass-through slot in the adjacent wall of the housing to prevent the air stream from entering or exiting the air passage through the pass-through slot;

introducing the air stream into the air passage through an air intake defined by the housing;

flowing the air stream around the terminal end of the diverter wall to change a direction of the air stream thereby reducing the water content of the air stream;

filtering the air stream having the reduced water content with the filter assembly disposed in the air passage downstream of the terminal end of the diverter wall; and discharging the air stream having the reduced water content from the housing of the water separator.

* * * * *